United States Patent
Tsai et al.

(10) Patent No.: US 7,518,672 B2
(45) Date of Patent: Apr. 14, 2009

(54) DIRECT TYPE BACKLIGHT MODULE

(75) Inventors: Yi-Shiuan Tsai, Kaohsiung (TW); Yi-Jing Wang, Hua Lien (TW)

(73) Assignee: AU Optronics Corp., Hsinchu (TW)

( * ) Notice: Subject to any disclaimer, the term of this patent is extended or adjusted under 35 U.S.C. 154(b) by 111 days.

(21) Appl. No.: 11/483,074

(22) Filed: Jul. 10, 2006

(65) Prior Publication Data

US 2007/0013826 A1    Jan. 18, 2007

(30) Foreign Application Priority Data

Jul. 15, 2005    (TW) .............................. 94124038 A

(51) Int. Cl.
*G02F 1/1333* (2006.01)
(52) U.S. Cl. .......................................... 349/58; 349/56
(58) Field of Classification Search .................... 349/56, 349/58
See application file for complete search history.

(56) References Cited

U.S. PATENT DOCUMENTS

| | | | |
|---|---|---|---|
| 6,020,867 A * | 2/2000 | Shimada et al. ................ 345/87 |
| 6,933,990 B2 * | 8/2005 | Park .............................. 349/59 |
| 7,059,757 B2 * | 6/2006 | Shimizu ....................... 362/561 |
| 7,237,923 B2 * | 7/2007 | Ono ............................. 362/218 |
| 7,270,464 B2 * | 9/2007 | Nakayoshi et al. ........... 362/613 |
| 2003/0007109 A1 * | 1/2003 | Park .............................. 349/58 |
| 2005/0140843 A1 * | 6/2005 | Shimizu ........................ 349/58 |
| 2005/0237752 A1 * | 10/2005 | Ono ............................. 362/373 |
| 2005/0242362 A1 * | 11/2005 | Shimizu et al. ................ 257/99 |
| 2008/0129927 A1 * | 6/2008 | Hamada et al. ................ 349/65 |

FOREIGN PATENT DOCUMENTS

JP    2005-84354 A    3/2005

* cited by examiner

*Primary Examiner*—K. Cyrus Kianni
(74) *Attorney, Agent, or Firm*—Birch, Stewart, Kolasch & Birch, LLP

(57) ABSTRACT

A direct type backlight module comprises a back bezel, a light source, a circuit board, and a heat-insulating element. The light source comprising a plurality of driving elements coupled thereto is disposed within the back bezel. The circuit board is disposed outside the back bezel. The heat-insulating element is disposed between the back bezel and the circuit board so as to form a first convectional space and a second convectional space.

5 Claims, 4 Drawing Sheets

DIRECT TYPE BACKLIGHT MODULE

BACKGROUND OF THE INVENTION (1) Field of the Invention

The present invention relates to a direct type backlight module, especially for a backlight module that comprises a heat-insulating element for enhancing light emitting efficiency of the backlight module.

(2) Description of the Prior Art

The advantages of high pixels, low irradiation, high space flexibility, and low power consumption make the Liquid crystal displays (LCD) more and more popular in the display markets. In the LCD, the liquid crystal molecules can not luminescence themselves, and so a backlight light module is needed to provide light sources of the display.

Please refer to FIG. 1A, which shows a cross section view of a conventional liquid crystal panel 1 and a direct type backlight module 2 as the light source of the panel 1. The backlight module 2 comprises a back bezel 21, a light source 22, and a plurality of driving elements 23. The driving elements 23 comprise some electrical elements such as power crystals or transformers which may produce lot of heat while in operation, in which the heat thereto is a major heat source within the backlight module 2. Additionally, the light source 22 also produces heat while in emitting light. Two kinds of heats accumulate within the backlight module 2 and affect the quality of the backlight module 2. Therefore, a distance D between the back bezel 21 and the driving elements 23 is introduced so as to enable the interior hot air to convect around in the space 24 produced by the distance D.

Please refer to FIG. 1B, which is an enlarged view of a portion of FIG. 1A. While the LCD is erected, an air enters the space 24 from a down side thereof and moves upwards as shown. The convection process will make the heat accumulated around the electrical elements and hence make the air temperature increase gradually. The accumulation of heat may influence both the light source and electrical elements simultaneously, and may thus further affect the efficiency of the light source and the heat resistance of the electrical elements. Empirically, the heat may decrease the light emitting efficiency of the backlight module by about 10%.

Hence, how to reduce the effect of the generated heat upon the light emitting efficiency is definite an important issue in this industry.

SUMMARY OF THE INVENTION

The object of the present invention is to provide a direct type backlight module comprising a heat-insulating element which may increase the light emitting efficiency of the backlight module.

Accordingly, a direct type backlight module disclosed herein comprises a back bezel, a light source, a circuit board, and a heat-insulating element. The light source comprising a plurality of driving elements coupling thereto is disposed within the back bezel. The circuit board is disposed outside the back bezel. The heat-insulating element is disposed between the back bezel and the circuit board so as to form a first convectional space and a second convectional space.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The present invention relates to a direct type backlight module, by adding a heat insulating element therein to enhance the total light emitting efficiency of the direct type backlight module. What follows is an embodiment to interpret the present invention detail, but not try to restrict the scope of the present invention.

Figure 1A:
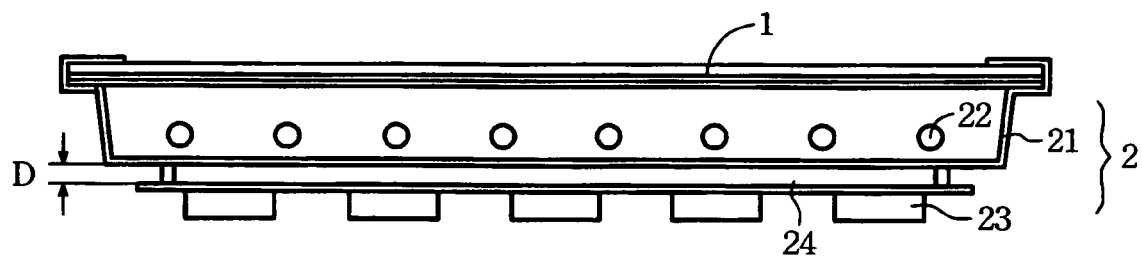
FIG. 1A shows a cross section view of a conventional liquid crystal panel and a direct type backlight module.
Figure 1B:
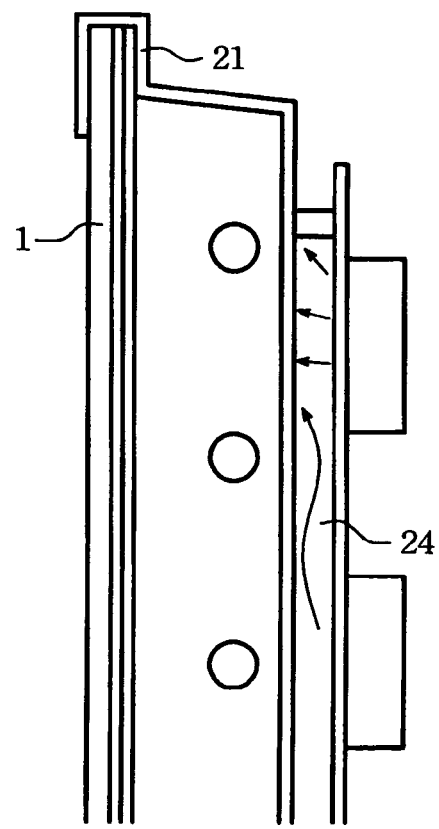
FIG. 1B shows a portion of FIG. 1A in an erect state.
Figure 2:
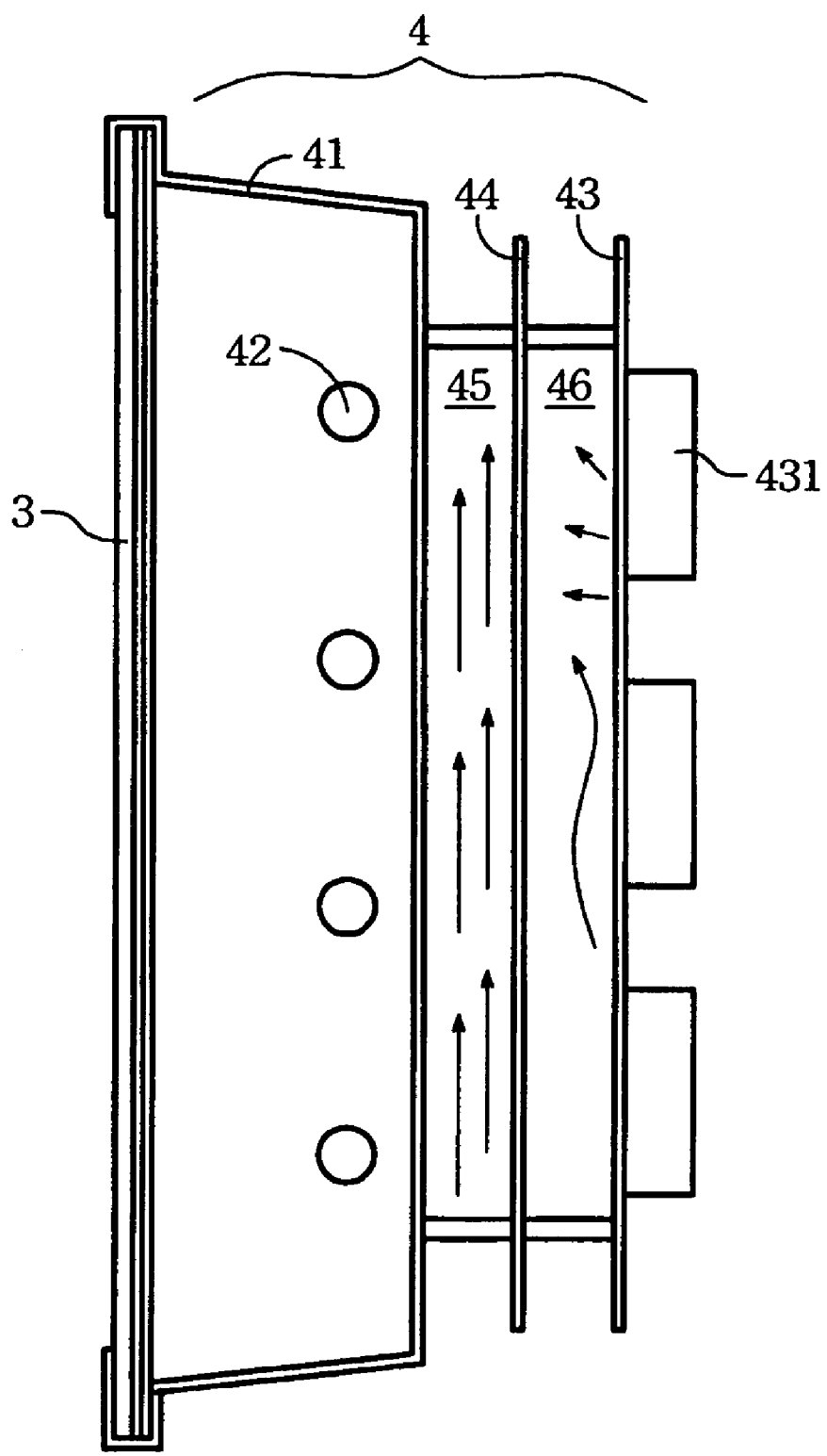
FIG. 2 shows an LCD panel 3 and one embodiment of the direct type backlight module in accordance with the present invention.

Please refer to FIG. 2, which shows an LCD panel 3 and one embodiment of the direct type backlight module 4 in accordance with the present invention. The direct type backlight module 4 comprises a back bezel 41, a light source 42, a circuit board 43, and a heat insulating element 44. The light source 42 is disposed within the back bezel 41. The circuit board 43 is disposed outside the back bezel 41. The circuit board 43 further comprises a plurality of driving elements 431, which are all electrically connected to the light source 42. As shown, the heat-insulating element 44 is disposed between the back bezel 41 and the circuit board 43 so as to form a first convection space 45 and a second convection space 46.

As mentioned in the foregoing background section, the heat from the electrical elements on the circuit board 43 and the heat from the light source are two major heat sources in the direct type backlight module 4. In one embodiment of the invention, the heat-insulating element 44 is a heat-insulating plate to divide the space between the circuit board 43 and the back bezel 41 into two convection spaces, a first convection space 45 and a second convection space 46. The first convection space 45 located between the back bezel 41 and the heat-insulating element 44 is used for the convection of hot air generated by the light source 42, and the second convection space 46 located between the heat-insulating element 44 and the circuit board 43 is used for the convection of the heat generated by the driving elements 431.

While in operation, the light source 42 and the direct type backlight module all produce heat, to exist as a hot air form, gradually. The heat-insulating element 44 herein plays a role as a bypass, which diverse the hot airs from the light source 42 and the driving elements 431. Different hot airs from different heat sources can radiate within different convection spaces, according to the present invention. In the art, these two heats interact with each other and empirically decrease the light emitting efficiency of the backlight module by about 10%. Nevertheless, by adding the heat-insulating element 44 of the present invention to the module 4, the decrease in light emitting efficiency can be lowered to about 5%, which provides a solid proof that the existence of the heat-insulating element 44 can really enhance efficiency in radiating heat and thus can help to reduce the formation of a higher temperature surrounding due to the light source 42.

As well known, the air in atmosphere has a tendency to convect upward gradually and so does the hot air inside the backlight module 4. As shown in FIG. 2, the hot air will accumulate gradually at an upside in an erect display, and hence the temperature of the higher portion of the module 4 is higher than that of the lower portion thereof. In a temperature testing upon an LCD having Cold Cathode Fluorescent Lamps via a heat simulation software, it shows that the effect of the hot air becomes remarkable in the light emitting efficiency of the light source at about the upper half portion of the panel. Therein the light source is a Cold Cathode Fluorescent Lamp (CCFL). When the temperature is between 45-65° C., the CCFL will get the best light emitting efficiency, but if the temperature is over that range, the light emitting efficiency is reduced.

Figure 3:
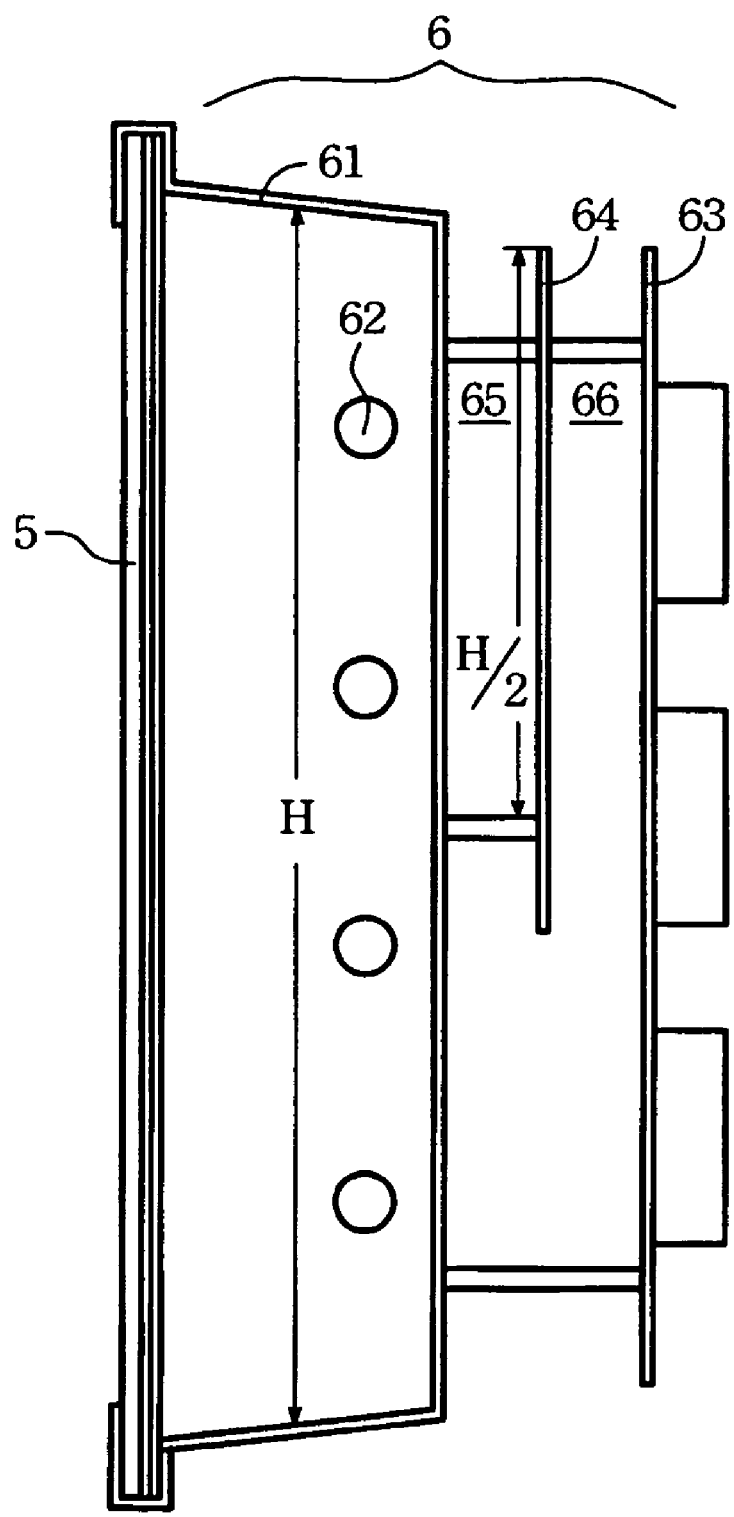
FIG. 3 shows an LCD panel 5 and another embodiment of the direct type backlight module of the present invention.

In the present invention, the disposition of the heat-insulating element 44 alters the phenomenon of heat accumulation. Please refer to FIG. 3, which shows an LCD panel 5 having another embodiment of the heat-insulating element 44 according to the present invention. The direct type backlight module 6 shown in FIG. 3 comprises a back bezel 61, a light source 62, a circuit board 63, and a heat-insulating element 64. The structural relationships of above elements are almost as the same as the elements in backlight module 4 of FIG. 2. The only difference is the length of the heat-insulating element 64 in the present embodiment is about half the length of the back bezel 61. As shown, two convection spaces 65 and 66 are formed at the upper portion of the space between the circuit board 63 and the back bezel 61, at where the heat is seriously accumulated. We also prove this point of view by measuring the surface temperature of several points on different panels, and the results tell that the decreased size the heat-insulating element didn't affect the efficiency of separating hot air into two different convection spaces. The heat-insulating element really do work after positioning on the right place with right size.

The major aim of the heat-insulating element of the present invention is to bifurcate the uprising hot air, and hence the material of the heat-insulating plate is not restricted herein. Materials like resins, PC, PVC or other materials may be selected to be the materials for the heat-insulating plate.

Figure 4A:
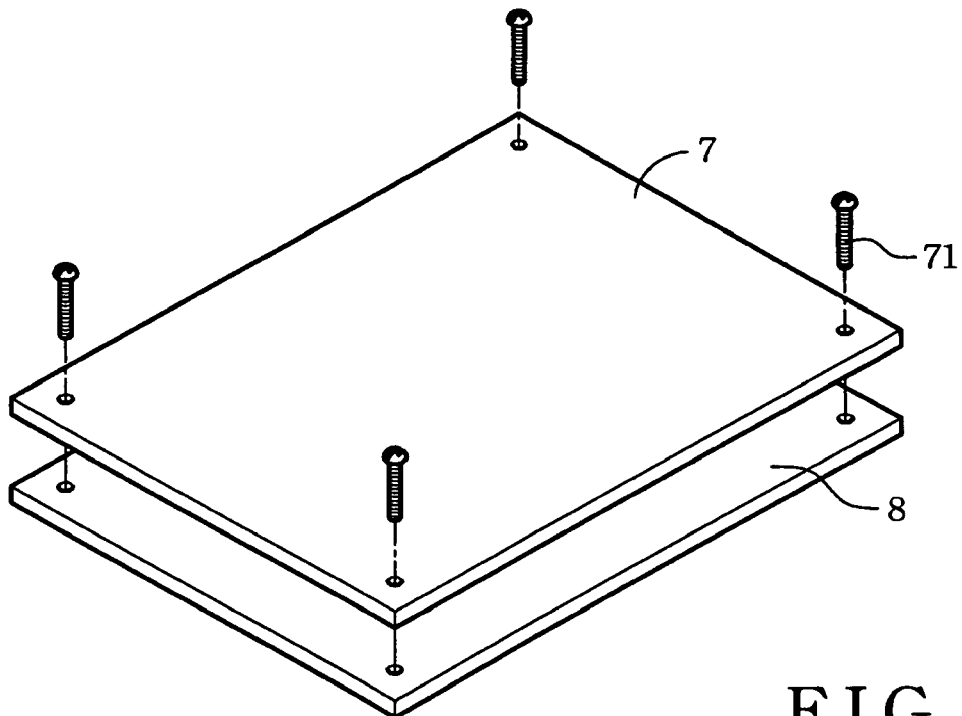
FIG. 4A shows how the heat-insulating plate of the present invention is assembled into the backlight module.
Figure 4B:
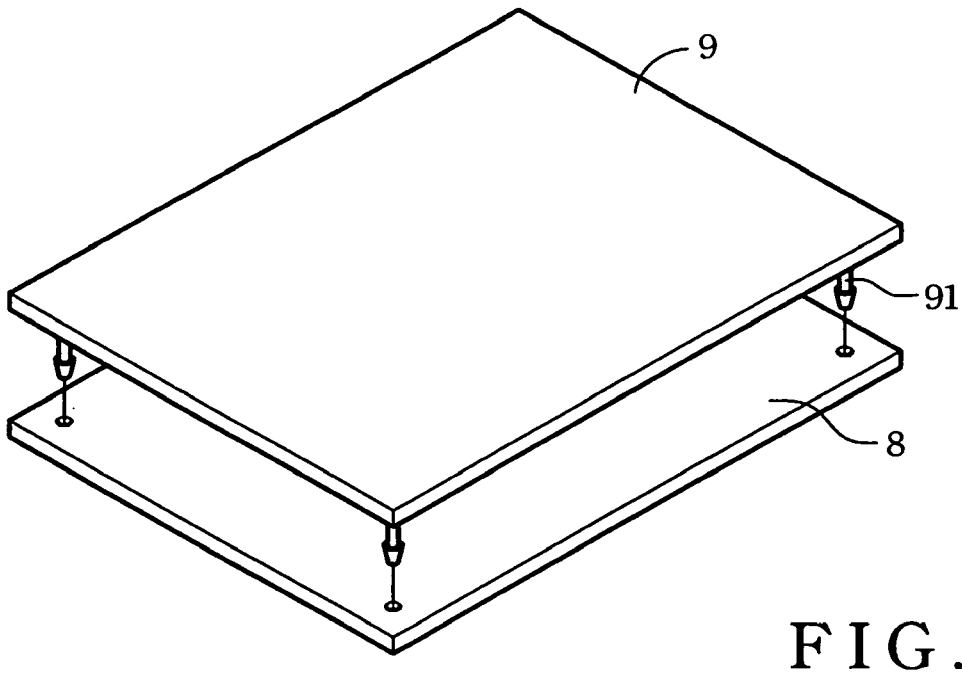
FIG. 4B is another diagram showing another embodiment of how the heat-insulating plate is assembled into the backlight module.

Please refer to FIG. 4A, which shows the diagram how the heat-insulating plate can be assembled into the backlight module. The heat-insulating plate 7 shown in FIG. 4A is fixed on a circuit board 8 through the screws 71. However, fixing through screws isn't the only way. Please refer to FIG. 4B, which shows another application, where the heat-insulating plate 9 is fixed on the circuit board 8 through a plurality of jammed plugs 91. No matter what mode is used to dispose the heat-insulating plate, for the heat-insulating plate is disposed to an inherent space of the LCD panel, so the inclusion of the heat-insulating plate in the backlight module would not affect design tendency in flimsy LCDs. That is to say that the thickness of the backlight module herein won't change after adding the heat-insulating element of the present invention.

While the present invention has been particularly shown and described with reference to a preferred embodiment, it will be understood by those skilled in the art that various changes in form and detail may be without departing from the spirit and scope of the present invention.

We claim:

1. A direct type backlight module comprising:
   a back bezel;
   a light source disposed within the back bezel;
   a circuit board, disposed outside the back bezel, having a plurality of driving elements electrically coupled to the light source; and
   a heat-insulating element disposed between the back bezel and the circuit board so as to divide a space between the back bezel and the circuit board into a first convectional space close to back bezel and a second convectional space close to the circuit board, wherein the first convectional space is in communication with the second convectional space;
   wherein a length of the heat-insulating element is about half a length of the back bezel.

2. The direct type backlight module of claim 1, wherein the length of the first convectional space is larger than the length of the second convectional space.

3. The direct type backlight module of claim 1, wherein the dimension of the first convectional space is smaller than or equal to the dimension of the second convectional space.

4. The direct type backlight module of claim 1, wherein the heat-insulating element is fixed on the circuit board through a screw.

5. The direct type backlight module of claim 1, wherein the heat-insulating element is fixed on the circuit board through a plurality of jammed plugs.

* * * * *